Patented May 19, 1925.

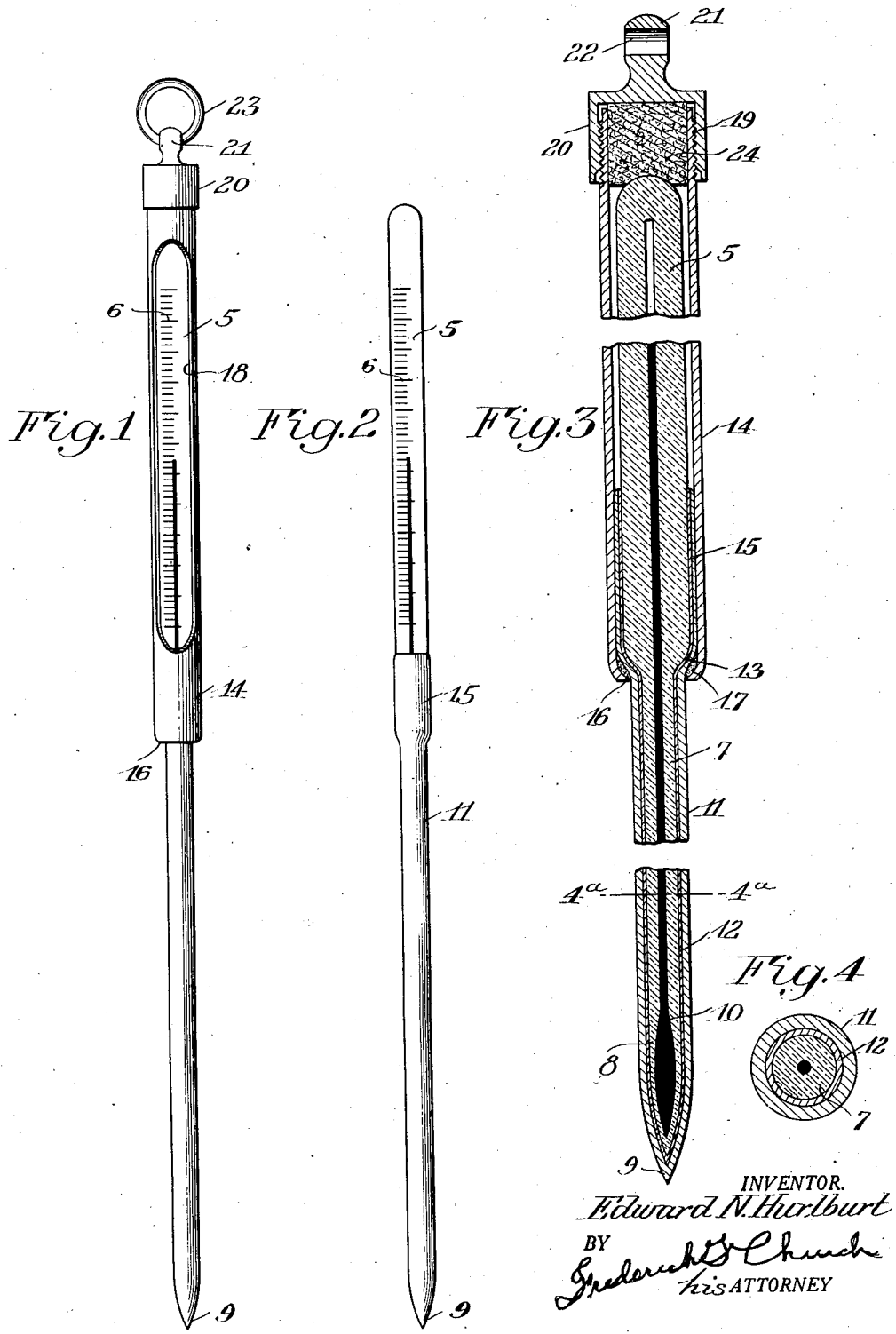

1,538,042

UNITED STATES PATENT OFFICE.

EDWARD N. HURLBURT, OF ROCHESTER, NEW YORK, ASSIGNOR TO TAYLOR INSTRUMENT COS., OF ROCHESTER, NEW YORK, A CORPORATION OF NEW YORK.

THERMOMETER.

Application filed June 20, 1923. Serial No. 646,506.

*To all whom it may concern:*

Be it known that I, EDWARD N. HURLBURT, a citizen of the United States, residing at Rochester, in the county of Monroe and State of New York, have invented certain new and useful Improvements in Thermometers; and I do hereby declare the following to be a full, clear, and exact description of the same, reference being had to the accompanying drawings, forming a part of this specification, and to the reference numerals marked thereon.

This invention relates to thermometers of the variety comprising a tubular stem and bulb containing an expansible fluid with markings on the stem for reading temperatures indicated by the expansion of the fluid, one object of the invention being to provide an accurate and durable thermometer of this type particularly adapted in form and arrangement for being thrust into a substance such, for example, as meat for exploring the interior temperatures thereof during sterilizing treatment. A further object is to provide such an instrument having an improved form of armor or sheathing so constructed and applied as to afford a maximum of conductivity between the substance to be tested and the thermometric fluid for purposes of accuracy, as well as features of size and shape adapting it for penetrating with ease the material to be tested.

To these and other ends the invention resides in certain improvements and combinations of parts all as will be hereinafter more fully described, the novel features being pointed out in the claims at the end of the specification.

In the drawings:

Fig. 1 is an elevation of a thermometer embodying the present invention;

Fig. 2 is a similar view with a casing portion removed;

Fig. 3 is an enlarged longitudinal sectional view partly broken away and;

Fig. 4 is an enlarged section on the line 4ª—4ª in Fig. 3.

Similar reference numerals throughout the several views indicate the same parts.

The invention is embodied in the present instance in a thermometer comprising preferably, a glass tube having a relatively enlarged scale portion adapted to carry a scale of sufficient size to be easily read, and a relatively reduced and elongated stem portion having a minimum diameter consistent with the requirements of strength in the completed instrument and terminating in an effectively pointed bulb adapted to be readily thrust to a substantial distance into the material to be tested. The bulb is a least as small in diameter as the elongated stem and quite sharply pointed to facilitate penetration into the material, the bulb and the stem portions being encased in a sheath of metal such as copper electrolytically deposited thereon. The other or scale portion of the tube is provided with a metal sleeve or casing overlapping and firmly united with the copper plating, with a sight opening or window through which the scale is visible, so that the whole instrument is fully reinforced and protected by metal armor applied in such a manner at the bulb portion as to afford maximum conductivity and accuracy.

Referring more particularly to the drawings, there is shown at 5, the scale portion of the tubular glass member forming the thermometer proper. This portion preferably has a substantial diameter for receiving a scale 6 of sufficient proportions to enable it to be quickly and easily read. At the lower end of this scale portion, the diameter of the tube is reduced to form a relatively slim, lancelike stem portion 7, having a length adapting it for penetrating to a considerable distance into the material to be tested. This stem portion terminates in a bulb 8 of the same diameter as the stem and having a sharply pointed end 9. At 10 is the sensitive fluid, in the present instance, mercury.

The stem and bulb portions as already stated are given a minimum diameter consistent with the necessary strength in the finished instrument and are reinforced by a sheathing or armor or copper plating 11. It is desirable for purposes of accuracy that such sheathing be at all points in intimate contact with the glass surface and united therewith in order that the heat may be quickly and completely transmitted to the glass and the sensitive fluid, and such construction obviously increases the strength and compactness as well. To this end the stem and bulb portions are first coated as at 12 with an electrically conductive film, such as silver, deposited thereon by chemical action, as well understood in the art. This coating is, of course, fixed on and in intimate association with the glass surface and serves as a conductor for electrolytically depositing on the bulb and stem a sheath of metal plate. The metal preferred for this purpose is copper and it is deposited in a plate of sufficient thickness to give the stem a strength in excess of any ordinary stresses that may be imposed in use while at the same time, due to its method of formation, being united with the silver film and the glass. The long exploring stem is thus rendered practically unbreakable by a sheath or armor which presents no interference to the rapid conduction of heat to the sensitive fluid.

The copper sheath of the stem portion is extended beyond the shoulder 13 formed at the junction of the stem and scale portions and for a substantial distance on the latter. A casing 14 is provided for the scale portion of the tube in the nature of a metal sleeve positioned to overlap the copper plating 15 on the lower end of the scale portion and closely fitting the same with the end of the casing rolled inwardly as at 16 around the shoulder 13. The protective casing 14 is thus firmly united with the sheathing of the stem and to render this connection still more secure an application of cement may be made between them as at 17.

The casing is formed with a sight opening or window 18, exposing the graduations of the scale, and the open upper end of the casing is externally threaded as at 19 and receives a cap 20, provided with a lug 21 having a bearing 22 for a convenient suspension ring 23. A plug of felt, cork or other suitable material 24 is preferably interposed between the end of the thermometer tube and the top of the cap so that as the latter is screwed home on the casing, the thermometer is by this means further secured in the position described.

The invention thus provides an efficient instrument having a high degree of accuracy and conveniently adapted in form and arrangement for the purposes specified. The construction furthermore affords a strong and durable thermometer which may be manufactured at a comparatively low cost.

I claim as my invention:

1. A thermometer comprising a glass tube having a scale portion and an elongated stem portion terminating in a bulb of substantially the same diameter as the stem and provided with a pointed end for piercing material to be tested, a reinforcing metal sheath electrolytically deposited on the surface of said bulb and stem portion and a protective metal casing for said scale portion extending at one end into overlapping relation with said sheath and having a sight opening through which the scale is visible.

2. A thermometer comprising a glass tube having a scale portion and an elongated stem portion terminating in a bulb of substantially the same diameter as the stem and provided with a pointed end for piercing material to be tested, said stem portion having a diameter less than that of said scale portion forming a shoulder at the junction of said portions, a reinforcing metal sheath electrolytically deposited on the surface of said bulb and stem portion and the contiguous end of said scale portion, a protective metal casing for said scale portion having an end thereof overlapping said sheath and rolled over said shoulder to afford rigid engagement with the sheath and provided with a sight opening through which the scale is visible, and a cap engaged with the other end of said casing and with said tube for securing the casing thereon.

EDWARD N. HURLBURT.